March 31, 1964 L. M. KEEFE 3,126,994
COIN CONTROLLED APPARATUS
Filed June 30, 1960 4 Sheets-Sheet 1

INVENTOR.
LINCOLN M. KEEFE
BY
ATTORNEY

March 31, 1964  L. M. KEEFE  3,126,994
COIN CONTROLLED APPARATUS
Filed June 30, 1960  4 Sheets-Sheet 2
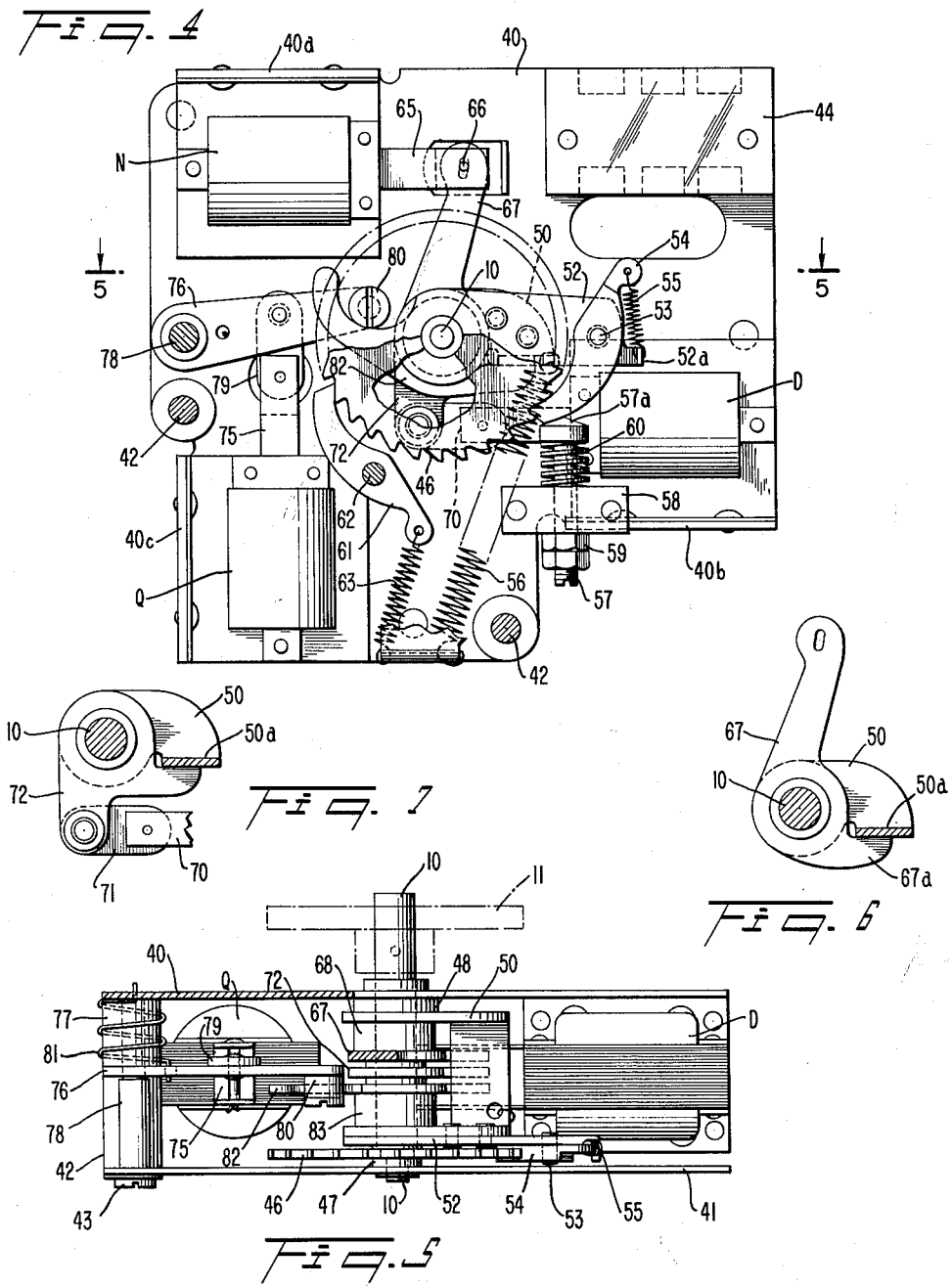
INVENTOR.
LINCOLN M. KEEFE
BY
ATTORNEY March 31, 1964   L. M. KEEFE   3,126,994
COIN CONTROLLED APPARATUS
Filed June 30, 1960   4 Sheets-Sheet 3
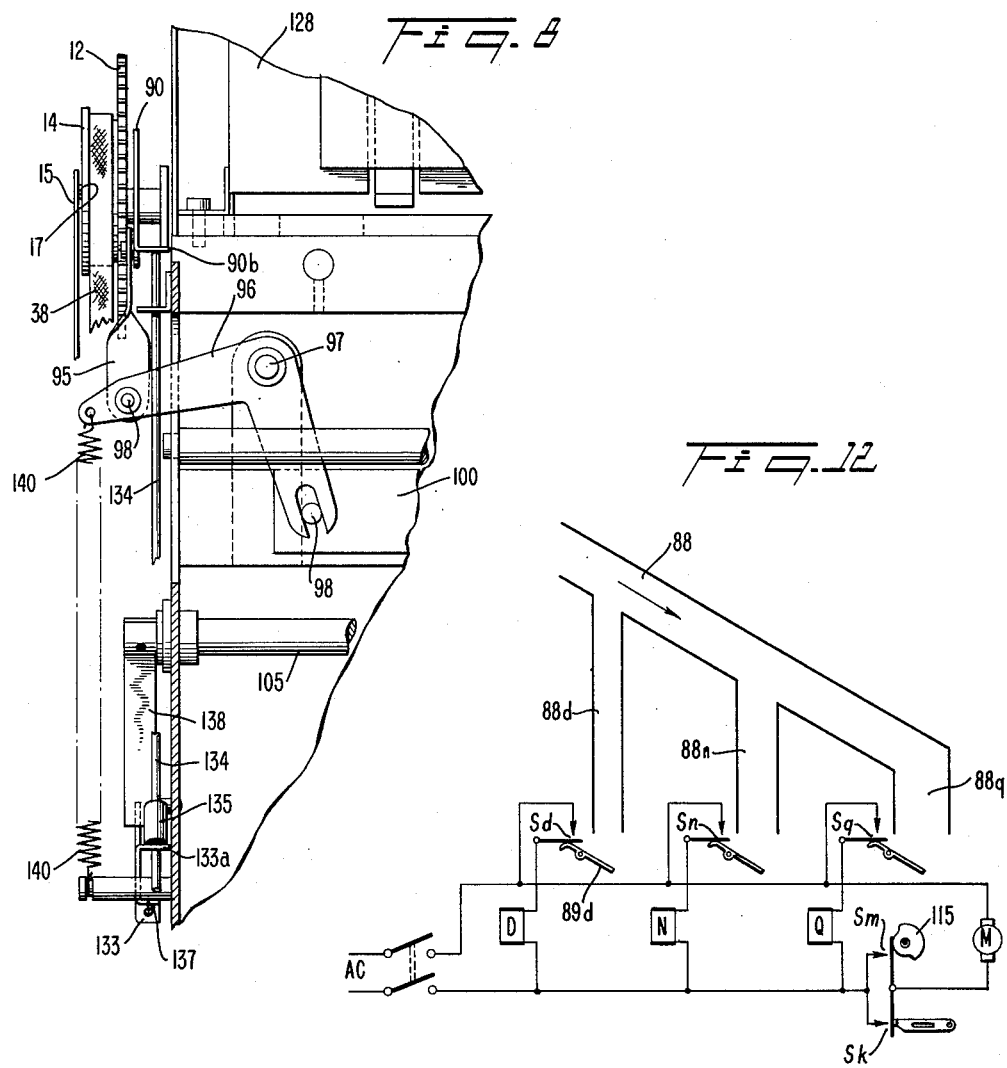
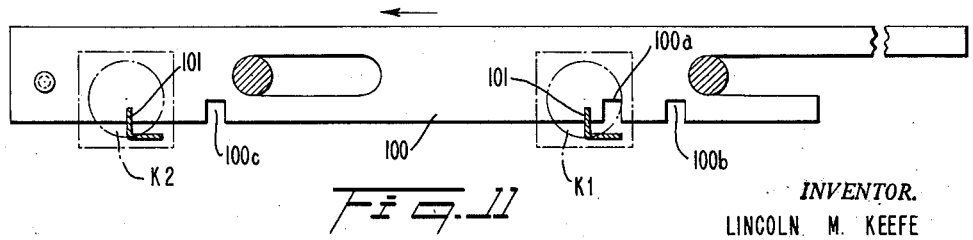
INVENTOR.
LINCOLN M. KEEFE
BY
ATTORNEY March 31, 1964 L. M. KEEFE 3,126,994
COIN CONTROLLED APPARATUS
Filed June 30, 1960 4 Sheets-Sheet 4
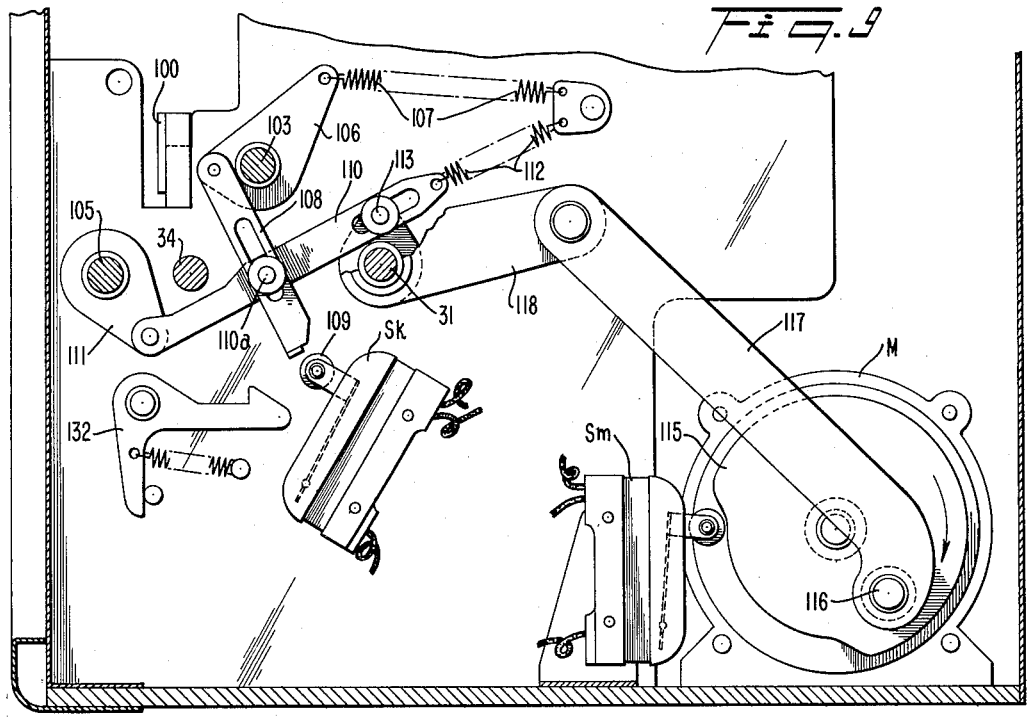
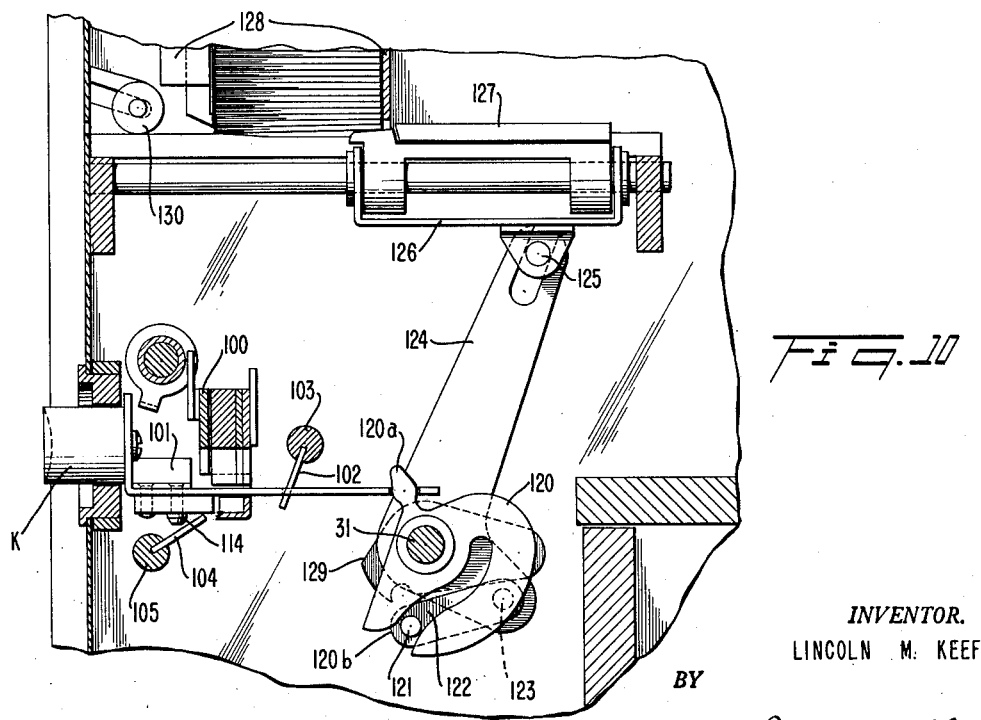
INVENTOR.
LINCOLN M. KEEFE
BY
ATTORNEY

United States Patent Office

3,126,994
Patented Mar. 31, 1964

3,126,994
COIN CONTROLLED APPARATUS
Lincoln M. Keefe, Elmhurst, N.Y., assignor, by mesne assignments, to International Postal Supply Corporation, a corporation of Massachusetts
Filed June 30, 1960, Ser. No. 40,096
18 Claims. (Cl. 194—1)

This invention relates to coin controlled article or service dispensing apparatus and more particularly to coin controlled credit means therefor.

The invention provides a novel and advantageous variable credit arrangement to control dispensing means according to various sums of deposited coinage.

An object of this invention is to provide a simplified coin operated credit entry or input mechanism which lends itself to economical manufacture as a pre-assembled package for association with any of a variety of devices required to function according to deposited coinage.

An object of the invention is to provide a coin operated credit arrangement in which a coinage credit input mechanism drives a credit totalizer in only one direction such as to advance the totalizer to an accumulated credit setting and in which the totalizer is reset independently of the input mechanism.

An object of the invention is to provide a coin operated credit input mechanism and a credit totalizer mechanism releasably coupled to each other, the coupling being engaged during a credit accumulating sequence to cause the input mechanism to advance the totalizer mechanism from zero position to an accumulated credit total position and the coupling being disengaged after the accumulating sequence to permit reset of the totalizer mechanism to zero position independently of the input mechanism.

An object of the invention is to provide a coin operated credit input unit uncomplicated by necessity of reset to an index position, whereby the input unit can be extremely simplified through the use of a unidirectionally rotative credit manifesting device operable in credit increments through successive revolutions in one continuous direction.

The credit input unit according to the invention involves a plurality of coin responsive means, specifically electromagnetic agencies such as solenoids, associated by novel motion determining linkages with a unidirectionally rotative device for controlling its actuation from any random position through a variable number of credit increments dependent on which of different value coins has been paid in.

An object of the invention is to provide a novel totaling and total sensing means in association with the coin operated credit input unit.

An object of the invention is to provide an arrangement in which a coin operated credit input drives a totalizer and in which the driving torque is substantially equalized through the range of credit accumulation of the totalizer.

An object of the invention is to provide for the coin operated credit input unit to drive the totalizer with impositive power, such as derived from a tensioned spring, whereby no damage to parts will occur upon attempt of the input unit to continue driving the totalizer after movement of the totalizer is blocked, as by reaching its limit.

An object of the invention is to provide total sensing means for sensing only a portion of the credit total range of the totalizer driven by the coin operated input unit, whereby credit totals below a minimum will produce no effect on the total sensing means.

An object of the invention is to provide novel means for preventing more than one dispensing operation for one credit payment made by coinage.

According to the invention, the credit input mechanism includes a ratchet wheel, a constantly engaged holding dog preventing reverse movement of the ratchet wheel, a drive pawl for the ratchet wheel, a plurality of solenoids—three in the specific embodiment—respectively responsive to the deposit of different value coins—nickels, dimes and quarters in the specific embodiment—variable throw linkages between the respective solenoids and the drive pawl whereby the pawl is controlled to advance the ratchet wheel through a variable number of credit increments dependent on the value of the deposited coin, and associated elements, all mounted on a subframe as a pre-assembled unit or package associable with totalizer and dispensing control means in any of various devices. Such association is specifically obtained by a gear on the ratchet wheel shaft releasably engaged by a toothed element of the totalizing mechanism, the toothed element being specifically a part of the totalizer and being demeshable automatically from the gear after the credit accumulating sequence to enable the totalizer to be reset without hindrance of the unidirectionally limited ratchet wheel, shaft and gear of the coin operated credit input unit.

In accordance with the total credit setting of the totalizer produced by drive from the coin operated input unit, total sensing means will selectively control dispensing means, such control being exercised through means such as a price bar which may correspond for example to the price bar in Keefe Patent No. 2,777,553. The subject invention provides for interlocking the total sensing means including the price bar with the dispensing means in a manner which prevents more than a single dispensing cycle for a single credit setting of the price bar.

Other objects of the invention will be pointed out in the following description and claims and illustrated in the accompanying drawings, which disclose, by way of example, the principle of the invention and the best mode, which has been contemplated, of applying that principle.

FIG. 4 is a side view of the coin operated credit input unit according to the invention, the cover or front side frame plate being removed to improve the showing.

FIG. 5 is a section along line 5—5 of FIG. 4.

FIG. 6 is a detail section showing the nickel bail lifter and bail.

FIG. 7 is a similar sectional showing of the dime bail lifter and associated elements.

FIG. 8 is a fragmentary front view of elements of the dispensing control means including the totalizer, total sensing means and price bar, and also shows a fragment of the magazine for supplying articles to be dispensed.

FIG. 9 is a side view of motor control means associated with article selecting means, such means being under control of the price bar.

FIG. 10 is a fragmentary side sectional view through the article dispensing mechanism and a key control therefor.

Figures 1, 2, 3:
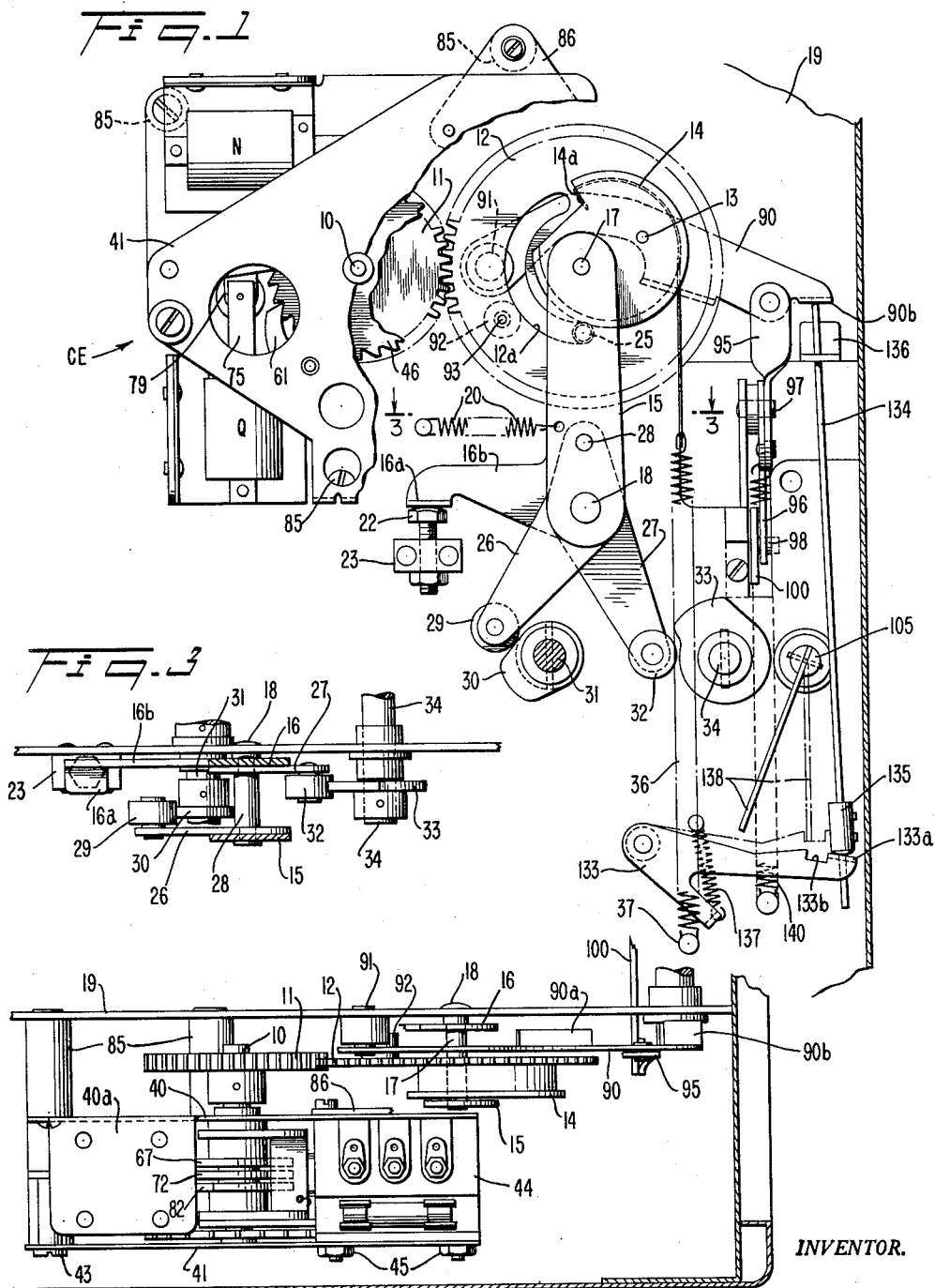
FIG. 1 is a side view of the illustrative embodiment of the novel credit arrangement and related elements, some parts being broken away to expose other parts.
FIG. 2 is a fragmentary top view of the arrangement in FIG. 1.
FIG. 3 is a section along line 3—3 of FIG. 1.

FIG. 11 diagrammatically indicates an illustrative association of the price bar and article selecting keys.

FIG. 12 is an elementary diagram of the coin chutes and the coin controlled circuits for the solenoids of the input unit and also shows the motor circuit.

Referring to FIG. 1, dispensing control means there shown includes an illustrative embodiment of the novel coin controlled credit means. Included in this credit means are a coin operated credit input mechanism CE and a credit totaling mechanism releasably associated with the input mechanism. During a credit establishing, accumulating sequence, the totaling mechanism is operatively connected with the input mechanism to receive and add credit entries therefrom. To apply credit entries to the totaling mechanism, the input mechanism has, on a ratchet wheel shaft 10 (also see FIG. 2), a gear 11 releasably engaged by gear teeth formed on the periphery of a totalizer member 12. Fastened by a pin 13 to one side of member 12 is a cam drum 14. The member 12 and drum 14 are rotatively mounted between arms 15 and 16 of a rocker assembly by a pivot pin 17 connected across the upper ends of these arms. The rocker assembly is pivoted on a stud 18 projecting horizontally from an upright frame plate 19. A spring 20 connected between the frame and arm 15 normally holds the rocker assembly in counterclockwise position in which the totalizer member 12 is meshed with gear 11. The depth of mesh is limited and adjustable by a screw stop 22 threaded into a frame-fixed nut 23 and abutted by the laterally bent tab 16a at the end of branch 16b of the arm 16.

During meshing of the totalizer member 12 with gear 11, the totalizer member can be actuated by the gear in credit adding direction. As will be brought out later in the detailed description of the credit input mechanism CE, the gear 11 is restricted to clockwise turning (as viewed in FIG. 1) and is turned in that direction through a variable number of credit increments depending on and corresponding to the value increments in the deposited coins. Clockwise turning of the gear 11 will effect credit entering actuation of totalizer member 12 in counterclockwise direction. The adding direction of member 12 is thus its counterclockwise direction in FIG. 1, and it will be advanced in that direction a variable credit indicative distance from zero position. The zero position is shown in FIG. 1 and is the one in which an arcuate slot 12a in the totalizer member has its lower end against a stop pin 25. The stop pin 25 is connected across the rocker assembly arms 15 and 16 and freely passes through slot 12a. Successive credit inputs to the totalizer member will advance it from zero position a total counterclockwise distance corresponding to the sum of the successive credit inputs.

The credit means also includes means for sensing the total credit position of the totalizer member and for controlling dispensing means accordingly. The total sensing means and the dispensing means will be explained later. For the present it is sufficient to point out that during a dispensing operation the totalizer member will be reset to its zero position for a next credit accumulating sequence antecedent to a next dispensing operation. To enable the totalizer member to be reset without being impeded by the unidirectionally movable gear 11 of the credit input mechanism, the totalizer member will first be uncoupled from the gear. In order to uncouple and demesh the totalizer member from gear 11, the rocker assembly which mounts the totalizer member will be rocked clockwise. The rocker assembly includes a pair of cam follower levers 26 and 27, both free on pivot stud 18 of the assembly, and respectively pinned to arms 15 and 16 by the opposite ends of a clevis pin 28 (also see FIG. 3). The lever 26 carries a roller 29 for coaction with a cam 30 on a power operated oscillatable main shaft 31 of the dispensing means. Lever 27 carries a roller 32 for coaction with a cam 33 on a manually operable coin return shaft 34. Clockwise movement of shaft 31 from its home position or counterclockwise movement of shaft 34 from its home position will swing the rocker assembly clockwise about its pivot 18 and thereby will bodily move the totalizer member to the right (FIG. 1) to unmesh it from the gear 11.

Upon being unmeshed from gear 11, totalizer member 12 is reset to zero position. Reset is effected under the power of a long, "soft" spring 36 which extends vertically between a frame stud 37 and the lower end of tape 38. The tape engages the spirally cam shaped periphery of drum 14, which turns with the totalizer member as a unit, and is anchored to the drum at the abrupt drop 14a from the high point of the spiral cam. During the counterclockwise, credit adding movement of the totalizer member, the drum winds up the tape 38 and stretches the spring 36. The resistance of the spring to the credit adding advance of the totalizer takes up undesirable backlash between the totalizer teeth and the teeth of gear 11. Also, the stretching of the spring during credit advance of the totalizer member stores power in the spring for returning the totalizer member subsequently, after the member has been demeshed from gear 11, to its zero position. The resistance of the spring increases proportionally to the amount it is stretched. To compensate for the increasing resistance of the spring to credit adding advance of the totalizer member as this member moves further away from its zero position and to avoid any bind on the gear 11 and permit the gear to operate smoothly and evenly regardless of the position of advance of the totalizer member, the spiral periphery of the drum 14 is arranged to present progressively descending radii to the tape 38. Thus as the totalizer member moves progressively further from zero position, the force of spring 36 acts at decreasing moment arm distance and the spring resistance to credit advance of the totalizer member is substantially equal and light throughout the fullest possible extent of credit advance. The totalizer member, in turn, transmits no uneven or heavy stress to gear 11, thus enabling the credit input mechanism to function smoothly and rapidly for effecting incremental credit advance of the totalizer throughout the fullest possible range of such advance. After the credit total has been read out of the totalizer, a dispensing cycle is initiated and the totalizer member is unmeshed from the gear 11, as already described. Spring 36 thereupon relaxes and returns the totalizer member clockwise (FIG. 1) to zero position with light torque.

By providing for the credit totalizer 12 to be reset without attendant resetting of the credit input gearing, including gear 11 and its shaft 10, the invention also provides for significant simplification of the coin operated credit input mechanism C since the input gearing can be limited to unidirectional motion. Further, since the credit totalizer and the credit input gearing are releasably coupled, the coin operated credit input mechanism CE can be readily and economically manufactured as a separate pre-assembled unit for attachment as a sub-assembly to any of various vending machines to operate credit totaling means therein. Only a simple operative connection, such as the rotative gearing 11—12 for example, will be needed between the coin operated credit input unit and the totalizer, with provision for releasing the totalizer from the input unit prior to reset of the totalizer.

Coin operated credit input unit CE is shown detached in FIGS. 4 and 5. It has its own frame comprising a main support and rear side plate 40 and a front parallel side plate 41. Posts 42 are fixed at one end to plate 40 and are tapped at opposite ends to receive cap screws 43 for mounting the plate 41 to the posts. In the upper right corner between the frame plates is a terminal and spacer block 44 (also see FIG. 2) secured in place by bolt and nut elements 45. Ratchet wheel shaft 10 passes freely through bushings and hubs between the frame plates 40 and 41. Fixed to the shaft against a shoulder near its front end is ratchet wheel 46 which is spaced from plate 41 by a stepped bushing 47. Another stepped bushing 48 for shaft 10 is provided at the plate 40. Rotatably carried on shaft 10 between ratchet wheel 46 and bushing 48 is a bail 50 and an arm 52. The arm 52 is riveted to the near side of the bail 50 and in effect forms an extension of that side. Pivotally carried by a stud 53 on the arm 52 is a drive pawl 54 for the ratchet wheel. A spring 55 between the tail of the pawl and bent lug 52a at the outer end of arm 52 biases the pawl into comparatively light but effective engagement with the ratchet wheel. An operating spring 56 connects at the lower end to the frame of the input unit and is hooked at the upper end to the bail 50. Under the influence of spring 56, bail structure 50—52 is normally maintained in a clockwise limit position which also may be called the rest position. In limit position, the nose end of the pawl 54 is wedged firmly between a ratchet tooth notch and the conical head 57a of a stop pin 57. The stop pin passes freely through a block 58 fixed to side frame 40 and is threaded below the block to carry nuts 59. A shock absorbing spring 60 encircles the pin 57 between its head and the block 58. The ratchet wheel is restricted to rotation in one direction, clockwise in FIG. 4, by a holding pawl 61 pivoted on a stud 62 extending from frame plate 41. A string 63 biases the holding pawl into constant engagement with the ratchet wheel. By adjustment of nuts 59, the limit stop 57 for drive pawl 54 is so set that the ratchet wheel 46 will be positioned with an abrupt edge of a tooth at clearance distance from the nose of the holding pawl 61. This assures the holding pawl becoming engaged with a next tooth notch when the ratchet wheel is moved clockwise only one tooth distance by the drive pawl 54.

Actuation clockwise of the ratchet wheel 46 will be effected under control of coin responsive means by first ratcheting the drive pawl 54 counterclockwise past the teeth of the ratchet wheel 46 which is restrained from following by the holding pawl 61. Such counterclockwise movement of the drive pawl 54 will be against the resistance of spring 56 which will stretch and store power, so that when the drive pawl is released for clockwise return to the home position, the spring 56 will effect such return and cause the pawl to advance the ratchet wheel. In the present case, the ratchet wheel will be advanced either one, two or five tooth distances, each tooth distance corresponding to a unit or increment of credit value which is taken here as a nickel. Three solenoids N, D and Q respectively responsive to deposit of a nickel, dime and quarter in the machine are provided to control the advance of the ratchet wheel through one, two and five credit increments. The solenoid N is dependently fixed to a horizontally bent top ledge portion 40a of the main support plate 40. The solenoid D is secured onto a horizontally bent lower ledge 40b of the frame plate 40, and the solenoid Q is fixed to a vertical, right angularly bent arm 40c of the frame plate 40.

Plunger 65 of the nickel solenoid N has a pin and slot connection 66 with the vertical arm of a lever 67. The hub 68 of lever 67 has free fit on shaft 10 and abuts the inside face of the far side of bail 50. A horizontal arm 67a of the lever (also see FIG. 6) is engaged under the cross bar 50a of bail 50 to act as a bail lifter. Energization of solenoid N attracts plunger 65, causing counterclockwise movement of the lever 67, this movement being communicated by its arm 67a to bail 50 and bail extension 52, whereby the drive pawl 54 is moved back relative to the ratchet wheel 46 which is restrained from following by the constantly engaged holding pawl 61. The plunger 65 bottoms when the drive pawl has been moved back, counterclockwise in FIG. 4, a distance of one tooth plus proper clearance. At completion of this movement of the pawl, it is engaged with the tooth immediately behind the one previously engaged. When the solenoid N is deenergized, the spring 56 returns the bail structure 50—52 and the lever 67 and plunger 65 to their rest positions. Drive pawl 54 returns, with the bail structure, to the limit position set by the shock absorbing stop 57 and advances the ratchet wheel, clockwise in FIG. 4, through a number of credit increments or tooth spaces equal to the number of teeth past which the drive pawl had been moved in reverse direction by the lifter lever under control of a coin responsive solenoid. In the case of the nickel solenoid, the drive pawl has been moved reversely one tooth plus clearance and hence the pawl, on its return, will advance the ratchet wheel one full tooth distance. As the drive pawl completes its return to rest position, its nose end is wedged between the conical head 57a of the limit stop 57 and the ratchet wheel and "freezes" in rest position without any overthrow.

The plunger 70 of the dime solenoid D is connected by a link 71 to a lever 72 (see FIGS. 4, 5 and 7) having a free fit on shaft 10 and provided with a horizontal arm similar to the bail lifter arm 67a. On the energization of solenoid D, the plunger 70 will rock the lever 72 counterclockwise and the lifter arm of this lever will communicate this motion to the bail structure 50—52 and hence to the drive pawl 54. It will be noted that the two arms of dime bail-lifter lever 72 are substantially equal. In contrast, the vertical arm of the nickel bail-lifter lever 67 is nearly twice as long as the horizontal arm 67a. Plungers 70 and 65 will be moved by their solenoids substantially equal distances but because of the different ratios of the arms of levers 72 and 67, the horizontal bail engaging arm of lever 72 will be moved substantially twice the distance of the bail engaging arm 67a. The net effect is that the energization of the dime solenoid D will result in retreat of the drive pawl a distance of two ratchet teeth plus given clearance while the energization of the nickel solenoid will result in retreat of the drive pawl a distance of one tooth plus clearance. Hence, on the deenergization of the dime solenoid, the drive pawl will be effective under the power of spring 56 to advance ratchet wheel 46 through two teeth or two credit increments.

Energization of the quarter solenoid Q, in response to payment into the machine of a quarter, is required to be translated into a five-teeth advance of the ratchet wheel 46. In the interests of a small and compact credit input unit, the three solenoids are preferably of similar size and their plungers have substantially equal short strokes. Therefore, different leverages are required between the plungers and the bail lifter arms. In the case of the nickel and dime actions, the different leverages are obtained simply by different lever arm ratios of the lifter levers 67 and 72, as already described. To provide the desired movement multiplication between the plunger 75 of the quarter solenoid Q and the bail 50, a compound lever arrangement is used. This includes a lever 76 and the hub 77 of which is in free fit on a spacer post 78 across the frame plates 40 and 41. Plunger 75 is connected by a link 79 to a point of lever 76 substantially half way from its pivot point to its free end. On the free end is a roller 80 bearing, with spring pressure derived from a wire spring 81, on the concave edge of the left hand arm of a lever 82. The hub 83 of the lever 82 has a free fit on the shaft 10 and serves as a spacer between the inner face of the near side of bail 50 and the dime lifter lever 72. A bail lifter arm similar to the nickel and dime lifter arms is provided on the "quarter" lever 82. When the quarter solenoid Q is energized, it actuates the plunger 75 through a down stroke. This movement of the plunger is multiplied by the lever 76 at the free end, which carries roller 80. Roller 80, in turn, cams against the concave edge of lever 82 and rocks this lever counterclockwise, so that the right hand arm of the lever acts on the bail 50 to cause reverse movement of the drive pawl 54, against the pull of spring 56. At the beginning of the action, the spring resistance is smallest and so the roller 80 can appropriately engage the left hand arm of lever 82 at shortest moment arm distance from the lever axis. As the spring is stretched further, its resistance increases, but this is counteracted in part by the engagement of the roller 80 with the left hand arm of lever 82 at increasing moment arm distance and further counteracted by the increased pull of the solenoid Q on the plunger 75 as the plunger is drawn further into the solenoid. Through the compound leverage described above, a full stroke of the quarter solenoid plunger 75 produces retreat of the drive pawl 54 through five teeth plus clearance, whereby the return of the drive pawl will advance the ratchet wheel 46 five teeth or five credit increments, corresponding here to 25¢.

The credit input unit CE can be used in various vending machines as a sub-assembly to control a releasable totalizer member therein in accordance with the invention. The ratchet wheel shaft 10 and its totalizer driving gear 11 will be movable in credit increments of advance through successive revolutions in one direction while the totalizer member will be releasable for reset to zero or start position prior to each new credit accumulating sequence, as explained before in connection with the totalizer member 12 (FIGS. 1 and 2) of the disclosed embodiment. In the present case, the coin operated credit input unit is attached to the vending machine by spacer posts 85 extending from frame plate 19 of the vending machine to main frame plate 40 of the input unit and to a bracket 86 attached to the frame plate 40.

As now understood, the drive pawl 54 of the credit input unit is powered by spring 56 for advancing the ratchet wheel 46 which through the shaft 10 and gear 11 transmits the advance to the totalizer member 12. A significant advantage of using spring power for the working stroke of the drive pawl is that if any block occurs in the totalizer or associated parts, the entire driven train can stop without damage to any of the parts.

The coins to be used in establishing credit are nickels, dimes and quarters. Referring to the elementary diagram in FIG. 12, any of these coins can be deposited in the opening at the upper end of the inclined coin chute 88. A dime will drop down the narrowest chute 88d and in passing will flip the lever 89d of a micro switch to cause transient closure of the switch Sd and temporary energization of dime solenoid D by an obvious circuit. A nickel will be guided into its drop chute 88n and cause transient closure of micro switch Sn and temporary energization of nickel solenoid N. Finally, a quarter will be led to its chute 88q and cause transient closure of micro switch Sq and temporary energization of the quarter solenoid Q. The energizations of the nickel, dime and quarter solenoids N, D and Q respectively cause advance of the gear 11 of the credit input unit through one, two and five credit increments, and these credit increments are added by the totalizer member 12.

The credit arrangement includes means to sense the total position of totalizer member 12 and control article and change dispensing accordingly. The total sensing means includes a lever 90 mounted by a frame-based pivot 91 for rocking action in a plane parallel to and behind the member 12. A feature of the invention is that the price mechanism, which includes the total taking lever 90 and a connected price bar 100, is unactuated until the latter fractional part of the advance of the totalizer member 12 to a minimum price credit total position. Thereby the totalizer can have a considerable advance without requiring the price mechanism to have a corresponding long throw which would entail enlargement of the machine to accommodate such long throw. Instead, the price mechanism can have a much reduced throw, starting just short of the minimum article price credit advance of the totalizer. It is assumed for the shown embodiment that the minimum article price is 85¢ and the maximum is 97¢. In line with the invention, lever 90 has a rearwardly bent tab 90a spaced ahead of a total indexing roller 92, on a stud 93 carried by totalizer member 12, a distance equivalent to 80¢ when the totalizer member is at zero position. When 80¢ in coins has been paid in, roller 92 just engages abutment 90a. The next 5¢ incremental advance of the totalizer causes the roller 92 to move lever 90 anticlockwise to minimum price setting of 85¢. Thus, though the totalizer has moved a distance equivalent to 85¢, the sensing lever and connected price means have moved but a very short distance to attain minimum price setting. Further credit advance of 15¢ results in lifting of lever 90 to the $1 setting. At the $1.05 mark of member 12, its further advance is blocked by the top of slot 12a meeting pin 25. If more coins are inserted, input unit CE will not advance the totalizer past its limit, but no damage to parts will occur since the power for advancing the totalizer derives from the spring 56 in the input unit. The pressure of the gear 11 on member 12 for attempting to turn it past its limit merely tends to rock the carrying assembly for the totalizer member about the pivot 18, and since such tendency is resisted yieldably by the spring 20, no harm can result to any of the parts.

As shown in FIGS. 1 and 8, the total credit sensing lever 90 connects by a link 95 to one arm of a bell crank 96 pivoted on a fixed stud 97. The other arm of the bell crank has a slotted connection with a stud 98 on a slidably guided price bar 100. It is evident that the angular setting of the lever 90 directly determines the longitudinal setting of the price bar. This price bar is the equivalent of the price bar in the Keefe Patent 2,777,553 and in accordance with its setting blocks or permits manual operation of article selecting and change controlling keys. It is assumed here that there are two such keys K, one key K1 for selecting an article costing 85¢ and another key K2 for selecting an article selling for 97¢. The relation of these two keys to the price bar 100 in its home position is indicated diagrammatically in FIG. 11. Until the price bar is in a position indicative of 85¢ credit, it blocks depression of both keys. In its 85¢ credit setting, the price bar has a slot 100a in front of a lug 101 of the key K1, releasing this key for manual depression. The other key K2 is still blocked by a solid part of the price bar. In the $1 credit setting of the price bar, it alines a slot 100b with the lug 101 of the key K1 and a slot 100c with the lug 101 of the key K2, and the customer has his choice of which key to operate. If he depresses K1, the article costing 85¢ will be dispensed along with change of 15¢, the change being dispensed by means which do not enter into the present invention. If the key K2 is depressed, the article costing 97¢ will be dispensed and 3¢ change returned. It is understood that suitable means such as, for example, in the aforementioned Keefe patent are used to prevent depression of more than one key at a time. If credit exceeding $1 has been established by deposit of coins, the price bar 100 will be set in a position in which it opposes the key lugs 101 with solid surface, preventing depression of either key. A coin return button (not shown) may then be operated to cause the deposited coins to be returned. As previously explained, the coin return shaft 34 is oscillated upon coin return operation and its cam 33 (FIG. 1) acts on the arm 27 to uncouple the totalizer from the gear 11 of the input unit, whereupon the totalizer is reset to zero as an incident to return of the coins.

Referring to FIGS. 9 and 10, for each key K there is an individual arm 102 of a common motor switch control shaft 103 and there is also an individual latch arm 104 of a common key latch shaft 105. Shaft 103 has a lever 106 one arm of which connects to a homing spring 107 and the other arm of which pivotally suspends a finger 108 above the insulating roller 109 of a motor switch Sk. Finger 108 is slotted for receiving a pin 110a of a link 110. One end of this link is pivoted to a crank arm 111 of the key latch shaft 105. The other end of link 110 connects to a homing spring 112. The link 110 also is slotted for receiving a crank pin 113 on an arm of the main shaft 31. Upon depression of a key K released by the price bar, it acts on the associated arm 102 to move the motor switch control shaft 103 counterclockwise. At the same time, a projecting element 114 of the key deflects the key latch arm 104 downwardly, rocking the latch shaft 105 clockwise. The counterclockwise action of shaft 103 depresses the finger 108 but the concurrent clockwise action of the shaft 105 serves through link 110 to pull the finger to the left and away from the roller 109 of the switch Sk. When the key K has been pushed all the way in, the projection 114 passes the arm 104, whereupon the spring 112 is effective via the link 110 to snap the key latch arm 104 counterclockwise to latching position behind the key projection 114. At the same time, the spring 112 is effective via the link 110 to snap the lowered finger 108 to the right, whereupon the finger engages the roller 109 to close the motor switch S*k*.

Upon the closure of switch S*k*, the circuit of motor M is established (also see FIG. 12). A cam disk 115 on the motor driven shaft has a crank pin 116 connected by a link 117 to a crank arm 118 of the main shaft 31. Thus, during a revolution of the motor driven shaft, the main shaft is oscillated, first through a forward stroke and then through a return stroke, the forward stroke being counterclockwise in FIGS. 9 and 10 and clockwise in FIG. 1. During the forward stroke of the main shaft 31, its cam 30 (FIG. 1) acts on the arm 26 to uncouple the totalizer member 12 from the gear 11, whereupon the totalizer member is reset to zero as previously described. The total sensing arrangement of lever 90 and price bar 100 remains set, however, until the operated key K is unlatched.

Referring to FIG. 10, each key K has forked connection with a finger 120*a* of an individual interposer control cam 120 free on the main shaft 31. Cam 120 has a cam slot 120*b* engaged by one end of an interposer pin 121 which is on a link 122 pivoted at the rear by a stud 123 to the lower arm of a lever 124 free on the main shaft. The upper end of the lever 124 has slotted connection with a pin 125 on a picker slide 126 on which is a picker knife 127 normally behind the bottom article of a stack in a magazine 128. When a key K is pushed in, it rocks the associated individual cam 120 clockwise, whereupon the radially descending outer portion of the cam slot 120*b* moves the interposer pin 121 inwardly into a claw of an operating arm 129 fixed on the main shaft 31. Accordingly, during the forward stroke of the main shaft, counterclockwise in FIG. 10, arm 129 acts on the pin 121 and its carrying link 122 to rock the lever 124 counterclockwise. This actuates the picker slide 126 through its forward stroke during which the picker knife feeds an article from the magazine 128 and past a baffle roller 130 to a delivery position. It should be noted that the cam slot 120*b* has an arcuate dwell engaged with the interposer pin 121 during actuation of the article delivery means by the operating arm 129, thus permitting the cam 120 to remain set until the key K is unlatched and restored.

At 180 degrees of the cycle of the motor operated shaft, the crank pin 113 of the main shaft 31 moves the link 110 leftward (FIG. 9) sufficiently to rock the key latch shaft 105 to its clockwise limit, thus positioning the latch arms 104 completely below the key projections 114. Concurrently, the link 110 pushes the finger 108 to the left away from the roller 109 of the motor switch S*k* and into latched engagement with the hook end of a spring-loaded latch lever 132. As a result, the key latch shaft 105 and its arms 104 are locked down into key release positions and the switch S*k* reopens. Before the switch S*k* opens, however, the cam disk 115 on the motor driven shaft closes a parallel switch S*m* (also see FIG. 12) for a long enough duration to insure motor energization until the revolution of the motor driven shaft is completed.

When the customer releases the key K, the spring 107 restores the motor switch control shaft 103 clockwise (FIG. 9) and the arm 102 on the shaft restores the key to its unoperated position. As the shaft 103 returns, it raises the finger 108 off the latch 132. As far as the latch 132 is concerned, it is then ineffective to maintain the key latch shaft 105 in its key release position. But whether the key latch shaft is restored by the spring 112 to its normal position in which the latch arms 104 are in front of and in the path of the key projections 114 also depends on another safety latch 133 shown in FIG. 1.

The latch 133 is held in the down position shown in FIG. 1 when the total sensing lever 90 is in its normal and initial position. For this purpose, the end of the lever 90 has a tab 90*b* which bears on a rod 134 to which is fixed a thimble 135 bearing on a tab 133*a* at the free end of the latch 133. The rod 134 is loosely guided for vertical movement by a hole in a frame bracket 136 and a hole in the tab 133*a*. When the lever 90 is lifted to or beyond the total credit position indicative of a credit of 85¢, it permits the latch 133 to be moved by its spring 137 to the upper, dotted line position in FIG. 1. In this position of latch 133, its notch 133*b* will catch and latch an arm 138 fixed to the key latch shaft 105 when this shaft is rocked to its key releasing position (counterclockwise in FIG. 1 and clockwise in FIG. 9). The latched position of the arm 138 is shown in dotted lines in FIG. 1.

When the customer releases the key K after an article has been delivered, the spring 107 (FIG. 9) restores the shaft 103 to cause its arm 102 for the key to return the key to outer position. At the same time, the finger 108 is lifted from latch 132, whereupon the key latch shaft 105 is able to return from its key release position to its normal position, provided further that the price bar 100 has returned to its rest position. Upon return of the key K to its outer position, it is no longer interlocked with the price bar. Hence, a spring 140 (FIGS. 1 and 8) is able to restore the price bar and the connected credit sensing lever 90 to their rest positions. Upon restoration of the lever 90 to its rest position, it depresses rod 134 for pushing the latch 133 down, releasing arm 138 of the key latch shaft 105. The key latch shaft 105 is then completely released for return to its normal position, ready to latch in the next depressed key K.

The purpose of the latch 133 is to prevent a repeat dispensing operation from being falsely initiated after the article for which credit has been paid in has already been delivered. Suppose that a total credit of $1 had been paid in, and the price bar 100 has accordingly been set to the $1 credit indicative position. In this position of the bar, its notches 100*b* and 100*c* are respectively alined with the lugs 101 of the keys K1 and K2. Now if the key K1 is depressed, the 85¢ article will be dispensed and 15¢ change given. If the key K2 instead is depressed, the 97¢ article is dispensed and 3¢ change returned. Suppose that after the machine has delivered the selected article and change, the operator while releasing the pressure on the depressed key, say key K1, to permit its return to normal position simultaneously applies pressure on the other key, K2. Since the price bar 100 has its notch 100*c* in front of the key K2, the operator may succeed in pushing this key in while the other key is returning to outer position. But, a second dispensing cycle nevertheless will not be initiated. This is because the key K2 will prevent restoration of the price bar and connected lever 90, and if the lever 90 does not return to rest position, then the latch 133 does not release the arm 138 on the key latch shaft 105. With this shaft 105 latched down in its key release position, which is clockwise of the position shown in FIG. 9, the connected link 110 keeps the switch closing finger 108 to the left of the shown position. Hence, even if the key K2 has been pressed in, in the assumed example, thereby rocking the shaft 103 counterclockwise to depress the switch closing finger 108, the finger will not close the switch S*k* because it is held to the left of the switch by the link 110 and the still-latched shaft 105. A repeat dispensing cycle therefore will not occur for a single setting of the total credit sensing lever 90 and price bar 100. Not until the operator releases the second operating key K2, as fully permitted by the latched down key latch shaft 105, will the price bar 100 and lever 90 return to rest positions and not until the lever 90 returns to rest position does it depress the latch 133 (FIG. 1) to release the shaft 105 for restoration to its normal position.

A repeat dispensing operation for a single established $1 credit setting of the price bar 100 will similarly be prevented if after delivery had been made as a result of the depression of key K2, the operator pressed on the key K1 while releasing the pressure on the key K2. Reception of the lug 101 of the key K1 either in the slot 100a or 100b of the price bar will block the restoration of the price bar and lever 90 to rest positions and therefore the key latch shaft 105 will be detained in key release position and prevent the finger 108 from closing the motor switch Sk. Also, quick release and reapplied pressure to key K1 will, if it succeeds in entering the key lug 101 in the notch 100a, prevent return of the price bar to rest position and a second dispensing cycle will not occur. It is clear now that it is necessary after a dispensing cycle has been effected for a single credit setting of the totalizer and total sensing means 90 and 100 that the total sensing means return to start condition before a next dispensing cycle can occur. It is also evident that the totalizer member 12 must be uncoupled from gear 11 and the reset to zero of the totalizer member be properly performed if the totalizer roller 92 is to permit the total sensing lever 90 to return to its start position.

While the novel features of the invention as applied to the shown embodiment have been pointed out, it will be understood that various omissions, substitutions and changes in the form and details of the device illustrated may be made by those skilled in the art without departing from the invention. It is intended, therefore, to be limited only as indicated by the scope of the following claims.

What is claimed is:

1. In coin controlled apparatus, a rotative credit entry mechanism movable in credit increments through unlimited successive revolutions in one direction, means constantly engaging the entry mechanism to block its reverse turning, actuating means for the entry mechanism, and means responsive to applied coins for controlling said actuating means to turn the entry mechanism in said one direction from any random instant position through a number of credit increments dependent on the value of the coinage applied during a credit establishing interim, in combination with a totaling mechanism releasably mechanically drivably engaged during credit establishment with the entry mechanism for actuation thereby from a start position through a differential distance equivalent to the aggregate value of the applied coinage, means to disengage the totaling mechanism and the entry mechanism from each other after credit establishment, and means effective after the totaling mechanism has been disengaged from the entry mechanism for resetting the totaling mechanism to start position unimpeded by the unidirectionally rotative entry mechanism.

2. In coin controlled apparatus, a credit entry device including a frame, a credit applying shaft journaled in said frame, actuating means for the shaft, and means selectively responsive to applied coins of different values for operating said actuating means to turn the shaft through a number of credit increments varying with the value of the applied coin, in combination with a credit totaling mechanism having releasable positive drive-receiving mechanical connection with the credit applying shaft to be driven positively by said shaft in credit additive direction from a start position to a credit total position determined by the aggregate value of the coinage applied during a credit establishing interim, means for disconnecting the totaling mechanism from the credit applying shaft after said interim, and means for returning the totaling mechanism, after being disconnected from said shaft, in credit subtractive direction to start position.

3. In coin controlled apparatus, credit entry mechanism including a shaft and an entry gear thereon, means selectively responsive to applied coins of different values to produce, for each applied coin, rotative movement of the entry gear through a number of credit steps varying with the value of the applied coin, a credit totaling mechanism including a toothed element releasably meshed with the entry gear and through which the entry gear is effective to advance the totaling mechanism from a start position to a credit total position indicative of the aggregate number of credit steps of rotative movement of the entry gear during credit establishment, means for demeshing the toothed element from the entry gear after credit establishment, and means to reset the totaling mechanism to start position after demeshing of the toothed element from the entry gear.

4. In coin controlled apparatus, credit entry mechanism including a shaft and entry gear thereon, means selectively responsive to coins of different values to produce, for each applied coin, rotative movement of the entry gear through a number of credit increments varying with the value of the applied coin, a credit totaling mechanism including a toothed element releasably meshed with the entry gear and through which the entry gear advances the totaling mechanism from a start position to a credit total position indicative of the aggregate number of rotative credit increments of movement of the entry gear during credit establishment, means mounting the toothed element for movement bodily into or out of mesh with the entry gear, means for moving the toothed element bodily out of mesh after credit establishment, and means for resetting the totaling mechanism to start position after demeshing of the toothed element from the entry gear.

5. In coin controlled appaartus, credit input mechanism including a shaft and entry gear thereon, means selectively responsive to applied coins of different values to produce, for each applied coin, turning movement of the entry gear through a number of credit increments varying with the value of the applied coin, a rotative credit totalizer gear releasably meshed with the entry gear for rotative advance thereby from a start position to a credit total position indicative of the aggregate number of credit increments through which the entry gear is moved during credit establishment, a spindle for the totalizer carrier, a movable spindle carrier displaceable in a direction to mesh or demesh the totalizer gear from the entry gear, means to displace said spindle carrier in totalizer gear demeshing direction after credit establishment, and resetting means effective to reset the demeshed totalizer gear rotatively to its start position.

6. The apparatus according to claim 5, the resetting means including a drum rigidly turnable with the totalizer gear, a restoring spring, and a flexible element connected at one end to the spring and at the other end to the drum.

7. The apparatus according to claim 6, the drum having a radially descending substantially spiral contour engaged by the flexible element to compensate for increasing resistance of the restoring spring to increasing advance of the totalizer gear from the zero position.

8. As a subcombination for operating a totalizer in coin controlled apparatus, a pre-assembled credit input unit having its own subframe for attachment to the apparatus, a shaft rotatively supported in said subframe for credit input association with the totalizer when the input unit subframe is attached to the apparatus, a ratchet wheel fixed to said shaft, a holding dog in constant engagement with the ratchet wheel to exclude reverse movement of the wheel and its shaft, a drive pawl for the ratchet wheel, a bail structure free on the ratchet wheel shaft and pivotally mounting the drive pawl so that upon an operating stroke of an oscillation of the bail structure the drive pawl will be effective to turn the ratchet wheel in forward, credit entering direction, the bail structure including a cross bar, and means for variably oscillating the bail structure through different angular distances, said means including a plurality of coin responsive solenoids mounted together with their plungers upon the subframe, and variable throw linkages between the respective solenoid plungers and the bail structure including rockers free on the ratchet wheel shaft and having substantially similar bail lifter arms underlying the cross bar of the bail structure, each linkage being effective upon energization of the associated solenoid and through the bail lifter arm of the linkage to rock the bail structure and drive pawl thereon through a different angular stroke.

9. The subcombination according to claim 8, one of said linkages being of the compound lever type including in addition to its rocker a movement-multiplying lever between the associated solenoid plunger and the rocker.

10. In coin controlled vending apparatus, a rotative credit input device restricted to unidirectional movement, a credit totalizer device releasably coupled with the input device during a credit establishing interim antecedent to vending operation, actuating means for the input device, means selectively responsive to applied coins of different values for producing through said actuating means and for each applied coin a movement of the input device in its one direction from any random instant position through a number of credit increments varying with the value of the applied coin, the input device upon such movement imparting related adding advance to the coupled totalizer device, whereby the totalizer device is advanced from a start position to a credit total position determined by the number of credit increments of movement of the input device during the credit establishing interim, means to sense the credit total position of the totalizer device, vending cycle means, means enabled by the sensing means for bringing about a cycle of the vending cycle means, means included in the vending cycle means and acting during said cycle to uncouple the totalizer device from the input device, and means to reset the totalizer device to start position after being uncoupled from the input device.

11. In coin controlled vending apparatus, a rotative credit input device, a credit totalizer releasably coupled with the input device, actuating means for the input device, means selectively responsive to applied coins of different values for producing through said actuating means and for each applied coin a movement of the input device through a number of credit increments varying with the value of the applied coin, the input device upon each such movement imparting related adding advance to the coupled totalizer, whereby the totalizer is advanced from a start position to a credit total position determined by the aggregate number of credit increments of movement of the input device during a credit establishing interim, price mechanism actuated under control of the totalizer from a home position to a control setting corresponding to the credit total position, a plurality of selection keys optionally individually operable from normal position under control of the price mechanism and according to the control setting thereof, means rendered effective by operation of any of the keys for initiating an operating cycle of the apparatus, means acting during the cycle for releasing the totalizer from the input device, means for resetting the totalizer to start position after being uncoupled, means for resetting the price mechanism after return of the operated key to normal position, and means for disabling the cycle initiating means from repeat operation by any key until after the totalizer has been reset and the price mechanism has returned to home position.

12. In vending apparatus drivable by a motor through vending cycles, a credit arrangement including a totalizer, coin controlled means for advancing the totalizer from a start position to a credit total position indicative of the value of the coinage applied to the coin controlled means, total sensing means moved under control of the totalizer from a home position to a credit position corresponding to the credit total position, a price bar displaced by the total sensing means to a control position, a motor switch, means including a switch closing device actuated under control of the price bar at its control position for bringing the motor into operation to drive the vending apparatus through a vending cycle, a latch to hold the switch closing device out of action, vending cycle means acting during the cycle for interlocking the switch closing device with the latch, and means actuated by the total sensing means upon returning to home position for moving the latch to release the switch closing device.

13. In apparatus to perform vending cycles, credit manifesting means, coin controlled means for differentially setting the credit manifesting means to any of different control positions depending on the value of the coinage applied to the coin controlled means, a plurality of selection keys individually operable to sense for control position of the credit manifesting means, cycle initiating means actuated for initiating a vending cycle upon any of the keys sensing a control position, the cycle initiating means including a latch device having latch arms, one for each key, means yieldably holding the latch device in normal position for cycle-initiating actuation by any said key during movement of the key into latched engagement with the associated latch arm, vending cycle means effective during the initiated cycle for moving the latch device to key release position in which its arms are out of the paths of the associated keys, a detent for retaining the latch device in release position, and means actuated by the credit manifesting means for releasing the detent from the latch device to enable the latch device to return to normal position.

14. In vending apparatus, a credit arrangement including displaceable credit manifesting means and coin controlled means for displacing the credit manifesting means from a home position to a control position depending on the value of coinage applied to the coin controlled means, a selection key operable under control of the credit manifesting means at the control position, a key-restoring rocker actuated by the key upon its operation, a key latch also actuated by the key upon its operation and effective to latch the key in operated position against restoring action by said rocker, means jointly controlled by the rocker and the key latch upon their actuation by the key for bringing the vending apparatus into operation for a vending cycle, and means acting during the initiated vending cycle for releasing the key latch from the key to permit key restoration by said rocker.

15. The apparatus according to claim 14, including a detent engaged by the key latch upon its key releasing action for detaining the key latch in release position, and means actuated by the credit manifesting means on its return to home position for disengaging the detent from the key latch.

16. In coin controlled apparatus having minimum price operation, a credit total indexing element, means effective under control of coinage applied to the apparatus for producing advance of the indexing element from a start position to a credit total position depending on the aggregate value of the applied coinage, and price mechanism to be effective at minimum price setting to enable the apparatus for minimum price operation, said price mechanism including a total take-off member in the path of advance of said credit total indexing element but initially spaced ahead of the indexing element a distance equivalent to a credit value short of the minimum price, the indexing element engaging the total take-off member only during the latter fractional portion of the advance of the element to minimum price credit total position to impart movement to the total take-off member for locating the price mechanism at minimum price setting.

17. In coin controlled apparatus, a rotative credit entry mechanism movable in credit increments through unlimited successive revolutions in one direction, means constantly engaging the entry mechanism to block its reverse turning, actuating means for the entry mechanism, and means responsive to applied coins for controlling said actuating means to turn the entry mechanism in said one direction from any random instant position through a number of credit increments dependent on the value of the coinage applied during a credit establishing interim, in combination with a totaling mechanism releasably coupled during credit establishment with the entry mechanism for actuation thereby from a start position through a differential distance equivalent to the aggregate value of the applied coinage, means to uncouple the totaling mechanism from the entry mechanism after credit establishment, and means effective after the totaling mechanism has been uncoupled for resetting the totaling mechanism to start position unimpeded by the unidirectionally rotative entry mechanism, the means to uncouple the totaling mechanism including a coin return element and means operatively intervening between the coin return element and the totaling mechanism and controlled by operation of the coin return element.

18. In coin controlled apparatus, a rotative credit entry mechanism movable in credit increments through unlimited successive revolutions in one direction, means constantly engaging the entry mechanism to block its reverse turning, actuating means for the entry mechanism, and means responsive to applied coins for controlling said actuating means to turn the entry mechanism in said one direction from any random instant position through a number of credit increments dependent on the value of the coinage applied during a credit establishing interim, in combination with a totaling mechanism releasably coupled during credit establishment with the entry mechanism for actuation thereby from a start position through a differential distance equivalent to the aggregate value of the applied coinage, means to uncouple the totaling mechanism from the entry mechanism after credit establishment, and means effective after the totaling mechanism has been uncoupled for resetting the totaling mechanism to start position unimpeded by the unidirectionally rotative entry mechanism, the means to uncouple the totaling mechanism including a cyclical element of the apparatus brought into effect for a cycle under control of the totaling mechanism, and means operatively intervening between the cyclical element and the totaling mechanism and controlled by said element during its cycle to effect the uncoupling action.

References Cited in the file of this patent

UNITED STATES PATENTS

| | | |
|---|---|---|
| 2,606,639 | Dolman | Aug. 12, 1952 |
| 2,649,947 | Nelsen | Aug. 25, 1953 |
| 2,929,479 | Pferd | Mar. 22, 1960 |
| 2,966,980 | Nyberg | Jan. 3, 1961 |
| 2,974,772 | Zeigle et al. | Mar. 14, 1961 |